United States Patent
Somasundaran et al.

(10) Patent No.: US 10,198,431 B2
(45) Date of Patent: Feb. 5, 2019

(54) INFORMATION RELATION GENERATION

(75) Inventors: Swapna Somasundaran, Lawrenceville, NJ (US); Dingcheng Li, St. Paul, MN (US); Amit Chakraborty, East Windsor, NJ (US)

(73) Assignee: SIEMENS CORPORATION, Iselin, NJ (US)

( * ) Notice: Subject to any disclaimer, the term of this patent is extended or adjusted under 35 U.S.C. 154(b) by 375 days.

(21) Appl. No.: 13/214,291

(22) Filed: Aug. 22, 2011

(65) Prior Publication Data

US 2012/0078918 A1 Mar. 29, 2012

Related U.S. Application Data

(60) Provisional application No. 61/387,165, filed on Sep. 28, 2010, provisional application No. 61/388,017, filed on Sep. 30, 2010.

(51) Int. Cl.
*G06F 17/30* (2006.01)
*G06F 17/27* (2006.01)

(52) U.S. Cl.
CPC .......... *G06F 17/278* (2013.01); *G06F 17/277* (2013.01); *G06F 17/30707* (2013.01); *G06F 17/30731* (2013.01)

(58) Field of Classification Search
USPC ................................................ 707/736, 748
See application file for complete search history.

(56) References Cited

U.S. PATENT DOCUMENTS

| | | | |
|---|---|---|---|
| 6,101,515 A | 8/2000 | Conklin | |
| 2007/0073533 A1* | 3/2007 | Thione et al. | 704/9 |
| 2008/0275694 A1* | 11/2008 | Varone | 704/9 |
| 2008/0319978 A1* | 12/2008 | Brun et al. | 707/5 |
| 2009/0049127 A1* | 2/2009 | Juan et al. | 709/204 |
| 2009/0083256 A1 | 3/2009 | Bargeron | |
| 2009/0164431 A1* | 6/2009 | Zivkovic et al. | 707/3 |
| 2010/0082331 A1* | 4/2010 | Brun | G06F 17/2705 704/9 |
| 2010/0138452 A1* | 6/2010 | Henkin et al. | 707/803 |
| 2010/0153318 A1* | 6/2010 | Branavan et al. | 706/12 |
| 2010/0185659 A1* | 7/2010 | Bai et al. | 707/769 |
| 2010/0281025 A1* | 11/2010 | Tsatsou et al. | 707/733 |
| 2011/0004606 A1* | 1/2011 | Aumann et al. | 707/759 |

(Continued)

FOREIGN PATENT DOCUMENTS

EP 2224360 A1 9/2010

OTHER PUBLICATIONS

Doddington et al., The Automatic Content Extraction (ACE) Program Tasks, Data, and Evaluation, LREC-04, pp. 837-840, 2004.

(Continued)

*Primary Examiner* — Christopher J Raab (57) ABSTRACT

For generating a word space, manual thresholding of word scores is used. Rather than requiring the user to select the threshold arbitrarily or review each word, the user is iteratively requested to indicate the relevance of a given word. Words with greater or lesser scores are labeled in the same way depending upon the response. For determining the relationship between named entities, Latent Dirichlet Allocation (LDA) is performed on text associated with the name entities rather than on an entire document. LDA for relationship mining may include context information and/or supervised learning.

9 Claims, 5 Drawing Sheets

(56) References Cited

U.S. PATENT DOCUMENTS

| | | | | |
|---|---|---|---|---|
| 2011/0010367 | A1* | 1/2011 | Jockish et al. | 707/733 |
| 2011/0258188 | A1* | 10/2011 | AbdAlmageed et al. | 707/736 |
| 2011/0271232 | A1* | 11/2011 | Crochet et al. | 715/810 |
| 2011/0302162 | A1* | 12/2011 | Xiao et al. | 707/724 |
| 2012/0041953 | A1* | 2/2012 | Dumais et al. | 707/739 |

OTHER PUBLICATIONS

Andrews et al. Seeded Discovery of Base Relations in Large Corpora. In Proceedings of the Conference on Empirical Methods in Natural Language Processing, pp. 591-599. Association for Computational Linguistics, 2008.

Blei et al. Latent Dirichlet Allocation. The Journal of Machine Learning Research, 3:993-1022, 2003.

Chan et al. Exploiting Background Knowledge for Relation Extraction. In Proceedings of the 23rd International Conference on Computational Linguistics (Coling 2010), pp. 152-160, Beijing, China, Aug. 2010. Coling 2010 Organizing Committee.

Chen et al. Relation Extraction Using Label Propagation Based Semi-supervised Learning. In Proceedings of the 21st International Conference on Computational Linguistics and 44th Annual Meeting of the Association for Computational Linguistics, pp. 129-136, Sydney, Australia, Jul. 2006. Association for Computational Linguistics.

Cortes et al. Support-vector Network. In Machine Learning, pp. 20:273-297, Cambridge, Massachusetts, 1997. MIT Press.

Feldman et al. Boosting Unsupervised Relation Extraction by Using NER. In Empirical Methods in Natural Language Processing (EMNLP 2006), 2006.

Finkel et al. Incorporating Non-local Information into Information Extraction Systems by Gibbs Sampling. In 43rd Annual Meeting of the Association for Computational Linguistics (ACL), pp. 363-370, 2005.

Gamallo et al. Mapping Syntactic Dependencies onto Semantic Relations. In ECAI Workshop on Machine Learning and Natural Language Processing for Ontology Engineering. Citeseer, 2002.

Griffiths et al. Finding Scientific Topics. Proceedings of the National Academy of Sciences, 101 (Suppl 1):5228, 2004.

Freebase Data Dumps, Wikipedia, printed on Jul. 12, 2011.

Miller et al. A Novel Use of Statistical Parsing to Extract Information from Text. In Proceedings of the 1st North American chapter of the Association for Computational Linguistics conference, pp. 226-233. Morgan Kaufmann Publishers Inc., 2000.

Mintz et al. Distant Supervision for Relation Extraction Without Labeled Data. In Proceedings of the Joint Conference of the 47th Annual Meeting of the ACL and the 4th International Joint Conference on Natural Language Processing of the AFNLP, pp. 1003-1011, Suntec, Singapore, Aug. 2009. Association for Computational Linguistics.

Ramage et al. Labeled LDA: A Supervised Topic Model for Credit Attribution in Multi-labeled Corpora. In Proceedings of the 2009 Conference on Empirical Methods in Natural Language Processing: vol. 1-vol. 1, pp. 248-256. Association for Computational Linguistics, 2009.

Roth et al. Probabilistic Reasoning for Entity & Relation Recognition. In Proceedings of the 19th international conference on Computational linguistics-vol. 1, p. 7. Association for Computational Linguistics, 2002.

Roth et al. A Linear Programming Formulation for Global Inference in Natural Language Tasks. In Hwee Tou Ng and Ellen Riloff, editors, Proc. of the Annual Conference on Computational Natural Language Learning (CoNLL), pp. 1-8. Association for Computational Linguistics, 2004.

Roth et al. Global Inference for Entity and Relation Identification Via a Linear Programming Formulation. In Lise Getoor and Ben Taskar, editors, Introduction to Statistical Relational Learning. MIT Press, 2007.

Zhang et al. A Composite Kernel to Extract Relations Between Entities with both Flat and Structured Features. In Proceedings of the 21st International Conference on Computational Linguistics and the 44th annual meeting of the Association for Computational Linguistics, pp. 825-832. Association for Computational Linguistics, 2006.

Zhao et al. Extracting Relations with Integrated Information Using Kernel Methods. In Proceedings of the 43rd Annual Meeting on Association for Computational Linguistics, p. 426. Association for Computational Linguistics, 2005.

Zhu et al. MedLDA: Maximum Margin Supervised Topic Models. 26th Annual International Conference on Machine Learning, pages p. 1257-1264, Jun. 14-18, 2009.

Princeton university "about wordnet." wordnet. princeton university. 2010, printed Jul. 12, 2011. http://wordnet.princeton.edu.

Banerjee et al. Extended Gloss Overlaps as a Measure of Semantic Relatedness, In International Joint Conference on Artificial Intelligence (IJCAI-03), Acapulco, Mexico, 2003.

Finkelstein et al. Placing Search in Context: The Concept Revisited. In WWW, pp. 406-414, 2001.

Jiang et al. Semantic Similarity Based on Corpus Statistics and Lexical Taxonomy. In Proc. of the Int'l. Conf. on Research in Computational Linguistics, pp. 19-33, 1997.

Kolb. Disco: A Multilingual Database of Distributionally Similar Words. In Tagungsband der 9. Konvens, Berlin, 2008.

Kolb. Experiments on the Difference Between Semantic Similarity and Relatedness. In 17th Nordic Conference on Computational Linguistics—NODALIDA '09, 2009.

Landauer et al. A Solution to Plato's Problem: The Latent Semantic Analysis Theory of Acquisition, Induction and Representation of Knowledge. In Psychological Review, pp. 211-240, 1997.

Li et al. An Approach for Measuring Semantic Similarity between Words Using Multiple Information Sources. Knowledge and Data Engineering, IEEE Transactions on, 15(4):871-882, Jul. 2003.

Lin. Extracting Collocations from Text Corpora. In First Workshop on Computational Terminology, Montreal, Canada, 1998.

Lin. An Information-theoretic Definition of Similarity. In Int'l Conf. Machine Learning, 1998.

Liu et al. An Effective Approach to Document Retrieval Via Utilizing Wordnet and Recognizing Phrases. In 27th annual international ACM SIGIR conference on research and development in information retrieval, pp. 266-272. ACM Press, 2004.

Mohammad et al. Distributional Measures of Concept-distance: A Task-oriented Evaluation. In Empirical Methods in Natural Language Processing, Sydney, Australia, 2006.

Pedersen et al. Wordnet: similarity—Measuring the Relatedness of Concepts. In North American Chapter of the Association for Computational Linguistics (NAACL), Boston, 2004.

Rapp. A Freely Available Automatically Generated Thesaurus of Related Words. In 4th International Conference on Language Resources and Evaluation (LREC 2004), pp. 395-398, 2004.

Rinaldi. An Ontology-driven Approach for Semantic Information Retrieval on the Web. ACM Trans. Internet Technol., 9(3):1-24, 2009.

Turney. Mining the Web for Synonyms: Pmi-ir versus Isa on toefl. In EMCL '01: Proceedings of the 12th European Conference on Machine Learning, pp. 491-502, London, UK, 2001. Springer-Verlag.

Turney. A Uniform Approach to Analogies, Synonyms, Antonyms and Associations. In Coling '08: Proceedings of the 22nd International Conference on Computational Linguistics, pp. 905-912, Morristown, NJ, USA, 2008. Association for Computational Linguistics.

Varelas et al. Semantic Similarity Methods in Wordnet and their Application to Information Retrieval on the Web. In WIDM '05: Proceedings of the 7th annual ACM international workshop on Web information and data management, pp. 10-16, New York, NY, USA, 2005. ACM.

EP International Search Report dated Feb. 14, 2014 corresponding to EP International Application No. 11183094.9—filed Sep. 28, 2011 (6 pages).

* cited by examiner

INFORMATION RELATION GENERATION

RELATED APPLICATIONS

The present patent document claims the benefit of the filing date under 35 U.S.C. § 119(e) of Provisional U.S. Patent Application Ser. Nos. 61/388,017, filed Sep. 30, 2010, and 61/387,165, filed Sep. 28, 2010, the disclosures of which are hereby incorporated by reference.

BACKGROUND

The present embodiments relate to information relation generation. In particular, a word space of related words and/or relationship of named entities are generated.

Information retrieval (IR) may be used for monitoring vast amounts of information. For example, the entire web is monitored for information related to a subject, such as terror threat prediction or money-laundering detection. To find all relevant documents and avoid retrieving irrelevant documents, it is important to have a list of search terms that are both precise and comprehensive.

Generation of search terms may be challenging. For example, money laundering is a complex concept that involves many different and seemingly independent processes, such as a crime of some sort and a monetary investment involving the same set of persons or organizations. Creating relevant search terms is even more challenging for applications that forecast rare events (e.g., plant failures or terror threat) since it is futile to search for the event itself.

A human domain expert manually creating a list of search terms may be tedious, time consuming, error-prone and expensive. For automating word relatedness, relatedness or similarities may be based on lexicons and word ontologies. These relatedness measures are based on distances (edges or relations) between words in human-generated word ontologies, such as Wordnet or MeSH2. Corpus-based methods have been used for finding similarity between words based on the collocation (a words usage in a given dataset). Combined lexicon-based similarity and corpus-based similarity has been proposed. Corpora and thesauri with pre-computed similarity of all word pairs in the corpus enables users to query the corpus with a single word and get all words that are similar (or related), along with the similarity scores.

Building word spaces for real world applications still faces a number of challenges. Automated methods may result in very large lists that are noisy (e.g., words less related to a concept are included). Inspection of the entire list to remove the noise may require O(n) time, where n is the number of terms in the expanded word space. Setting a single score threshold across all seed term expansions may not work as not all seed words are equally related to a concept. For example in the concept of money-laundering, "crime" and "investment" are seeds. Crime and the terms expanded from crime are closer to money-laundering. Using a threshold may remove words more relevant than words that are not removed.

Relationships also exist between entities in a document. A named entity (NEs) is an object with a name. For example, persons, organizations and locations are entities with specific names. Mining relations between named entities may be useful for constructing knowledge bases with information about the named entities. Relation mining can enable a Question-Answering (QA) system to answer questions such as "who is X married to?" by looking for a spouse relation between X and other named entities of type "person." Relation mining between NEs may provide a social graph structures. Risk associated with a person can be calculated using his/her primary or higher order associations with risky persons or organizations. However, effectively capturing relationships between named entities may be difficult.

BRIEF SUMMARY

By way of introduction, the preferred embodiments described below include methods, systems, and instructions for generating relationship information. Two different types of relationship information may be generated independently of each other. Related words may be generated as a list for defining a word space. The relationship between named entities in one or more documents may be generated. Embodiments for these types of relationships are addressed below separately. The embodiments may be combined, such as generating the word-space and using the word-space to define documents for determining the relationship between named entities.

For generating a word space, manual thresholding of word scores is used. Rather than requiring the user to select the threshold arbitrarily or review each word, the user is requested to indicate the relevance of a given word. Words with greater or lesser scores are labeled in the same way depending upon the response. The process is repeated for the remaining unlabeled words.

For determining the relationship between named entities, Latent Dirichlet Allocation (LDA) is performed on text associated with the name entities rather than on an entire document for topic modeling. LDA for relationship mining may include context information and/or supervised learning.

In a first aspect, a method is provided for generating a context-specific word space. A processor sorts a list of terms according to a score for each term. A first term of the list is output. The first term is between at least second and third terms in the sorted list. An indication of whether the first term is related to a context is received. The processor categorizes the second term as related to the context where the indication is of the first term being related to the context and categorizes the third term as unrelated to the context where the indication is of the first term being unrelated to the context. The outputting, receiving, and categorizing are repeated for other, uncategorized terms of the list.

In a second aspect, a non-transitory computer readable storage media has stored therein data representing instructions executable by a programmed processor for generating a context-specific word space. The storage media include instructions for generating a list of words associated with a concept, sorting the list by a closeness score, and iteratively performing receiving a judgment of whether a first word within the list is related to the concept and labeling unlabeled ones of the words of the list from a first closeness score of the first word to a higher or lower closeness score as related or unrelated based on the judgment.

In a third aspect, a method is provided for mining a relationship of two named entities. A sentence with at least the two named entities is identified in a document. A processor defines an instance. The instance includes the two named entities, a type of named entity for each of the two named entities, and text in the sentence between the two named entities. The processor applies Labeled Latent Dirichlet Allocation (LLDA) to the document. The applying is a function of the instance. The processor identifies a relationship of the two named entities as a function of the application of the LDA.

In a fourth aspect, a non-transitory computer readable storage media has stored therein data representing instructions executable by a programmed processor for mining a relationship of two named entities. The storage media includes instructions for determining, with a machine learned classifier, a relationship distribution of the two named entities with Labeled Latent Dirichlet Allocation (LLDA) and context features, and identifying the relationship from the relationship distribution.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In some embodiments, a list of task-specific search terms is generated. The word space for a given context is created in a semi-automatic method and independent of the document to be searched. A small set of one or more manually generated seed terms are expanded to create a larger number of words in an expanded list. The expansion from one or more seeds is automatic. The seed terms define the context, such as crime and money being seed terms for money laundering. Any expansion may be used, such as graphical lexicons or semantic relatedness over corpora.

The expanded list is then pruned using thresholding or filtering. The thresholding is neither fully manual nor fully automatic. The human has to only judge the already generated terms, as against generating the terms himself/herself. Only a subset of words is presented to the user, and other terms are labeled regarding the context based on the presented words and corresponding user feedback. Manual labor is reduced by using sampling in the threshold operation, so that the human effort is minimized. A human in the threshold loop decides if the terms need to focus on specificity (more precision) or sensitivity (more recall) based on application requirements. Based on the user choices regarding whether a word is related or not, the specificity or sensitivity is controlled. Seed term-specific thresholding also allows inclusion of terms that are obliquely related, but significant, to the application. Optionally, the pruned list may be used as seeds and the process may be iterated to create even larger word spaces.

Word spaces are created for improving document retrieval and filtering. A search engine uses the pruned list to find relevant documents, to capture complex concepts, and/or to forecast or diagnose events. The pruned list is the comprehensive word space that forms the search terms in an IR engine. Faults in devices may be determined by document retrieval using a corresponding list of related terms. The word space may contain a wide variety of terms that are related to a central concept of interest, even though the words may not all be specifically or obviously related to one another. Word spaces can be easily tuned to task-specific requirements. Rare and previously unseen events may be captured. As the system is based on word lists for document filtering, the system is not dependent on training data for finding relevant documents.

In other embodiments, relations between named entities (NEs) are generated. Latent Dirichlet Allocation (LDA) is used for determining a relationship between NEs rather than topic detection of a document. LDA-based algorithms may be adapted for relation mining by using supervised learning and/or definition of instances to be used instead of documents.

Figure 1:
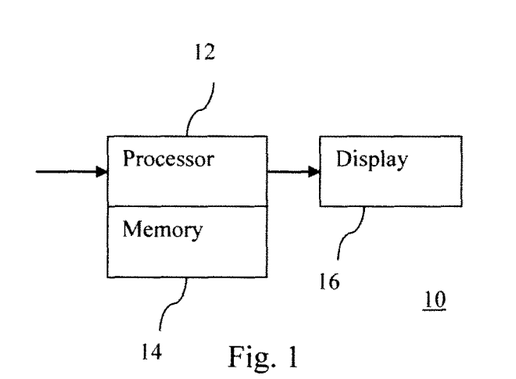
FIG. 1 is a block diagram of one embodiment of a system for generating relationship information, such as a word space or a relationship between named entities.

FIG. 1 shows a system 10 for generating a context-specific word space and/or for mining a relationship of two named entities. The system 10 includes a processor 12, a memory 14 and a display 16. Additional, different or fewer components may be provided. For example, a user input device (e.g., keyboard, trackball, touch sensor, mouse, buttons, sliders, or combinations thereof). The system 10 is a personal computer, workstation, network, or other now known or later developed system for generating a list or determining relatedness. For example, the system is a workstation for training a probabilistic model and/or applying the model.

The processor 12 is a general processor, digital signal processor, application specific integrated circuit, field programmable gate array, analog circuit, digital circuit, combinations thereof or other now known or later developed processor. The processor 12 may be a single device or a combination of devices, such as associated with a network or distributed processing. Any of various processing strategies may be used, such as multi-processing, multi-tasking, parallel processing or the like. The processor 12 is responsive to instructions stored as part of software, hardware, integrated circuits, film-ware, micro-code or the like.

The processor 12 operates to generate a context-specific word space and/or for mining a relationship of two named entities. The processor 12 may be connected with a network, such as for receiving a list. The processor 12 may be connected with a user input, such as for receiving seed terms, relatedness feedback, selection of training data, selection of named entities, selection of a document for determining named entity relationship, selection of expansion approach, and/or other operation.

In one embodiment, the processor 12 receives one or more seed terms, expands each of the seed terms, and prunes the list based on sampled user feedback and relatedness scores of the terms in the list.

In another embodiment, the processor 12 trains a model. A graphical or probabilistic model is built from training data labeled with the correct relationship. For example, a support vector machine, a Bayesian network, a conditional random field, an undirected network, a hidden Markov model and/or a Markov random field is trained by the processor 12. The model is a vector with a plurality of variables, but other model representations may be used. Single level or hierarchal models may be used. For training, both training data and LDA information are combined in a supervised approach. Formal criteria and/or algorithms may be incorporated. For example, a support vector machine may be trained automatically in an supervised manner to discriminate a feature. The machine learned support vector machine provides a hyper plane separating named entities that have a relationship from named entities that do not have a relationship. No or more limited manual expert intervention may be required to build the model. For example, an expert may assist in tuning the model after or while being built. As another example, the expert may merely indicate the relationship or not in the training data.

The processor 12 is operable to apply a model. For example, a combined support vector machine and LDA model is applied to a given document or collection of documents. The processor 12 determines a relationship between named entities.

The memory 14 is a computer readable storage media. Computer readable storage media include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 14 may be a single device or a combination of devices. The memory 14 may be adjacent to, part of, networked with and/or remote from the processor 12.

The memory 12 may store a list of words with or without corresponding scores. The memory 12 may store training data. The training data is a collection of one or more documents and/or instances of named entities with associated text. For example, hundreds, thousands or tens of thousands of instances are obtained and stored. Semantic information or other input feature vector information may be provided as part of the training data. Any format may be used for maintaining and storing the training data.

The memory 14 may store a document and/or instance associated with one or more named entities. Any other information used to generate a list for a context-specific word space or generate a relationship label between named entities may be stored. For example, seed terms are stored. As another example, corpus or lexicon information for expansion is stored. The sorted list may be stored. The pruned list or sorted list after thresholding may be stored. In yet another example, the machine learned algorithm or LDA model is stored as a matrix, software, or other data. Alternatively or additionally, the processor 12 accesses information from a network.

More than one classifier or model may be stored, such as having different models for different combinations of available data. Alternatively, the model allows for missing information. Each model is stored as a matrix, but more complex classifier algorithms, instruction sets, logic, or tools may alternatively or additionally be stored.

The memory 14 may be a computer readable storage media having stored therein data representing instructions executable by the programmed processor 12 for generating a context-specific word space and/or for mining a relationship of two named entities. The memory 14 stores instructions for the processor 12. The processor 12 is programmed with and executes the instructions. The functions, acts, methods or tasks illustrated in the figures or described herein are performed by the programmed processor 12 executing the instructions stored in the memory 14. The functions, acts, methods or tasks are independent of the particular type of instructions set, storage media, processor or processing strategy and may be performed by software, hardware, integrated circuits, film-ware, micro-code and the like, operating alone or in combination.

The display 16 is a CRT, monitor, flat panel, LCD, projector, printer or other now known or later developed display device for outputting determined information or for soliciting input from a user. For example, the processor 12 causes the display 16 at a local or remote location to output a word and a request for an indication of whether the word is sufficiently related to a given context. An indication of the repercussions of the selection may be output, such as indicating general information or a specific measurement regarding sensitivity and/or specificity. The word list as existing during expansion, during iterative thresholding, or after thresholding may be output. The word list may include or not include score information.

The display 16 may display all or part of a document, such as a document having two or more named entities. The display 16 may output one or more instances associated with two named entities. The distribution of possible relationships between two named entities in a document or documents may be output. Alternatively or additionally, the most probable (e.g., highest frequency) relationship for two named entities based on document or documents may be output.

Alternatively or additionally, the relationship, list or other output is stored in memory. The output may be provided to another system or another process for further use, such as information retrieval, risk assessment, or other application.

Figure 2:
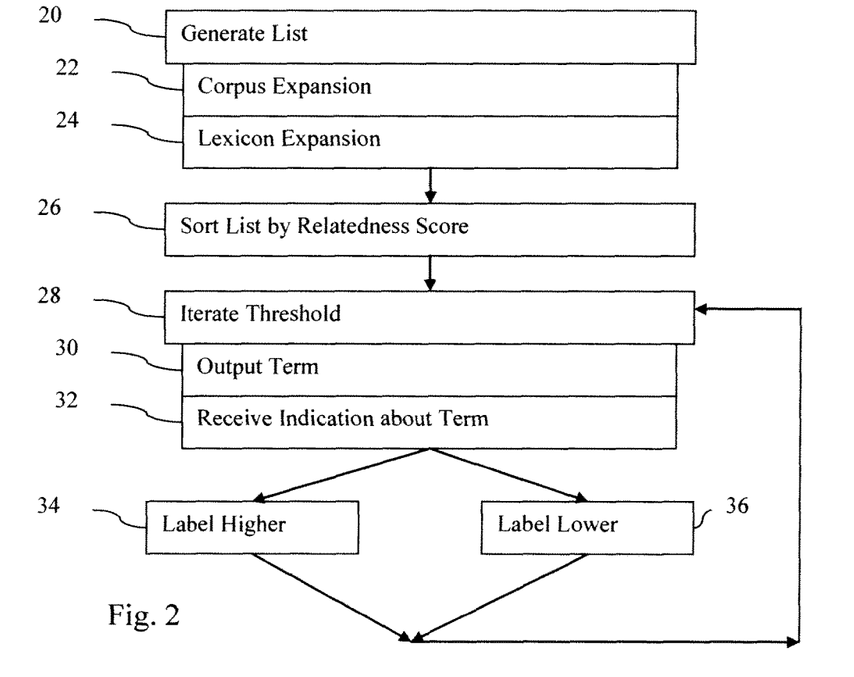
FIG. 2 is a flow chart diagram of one embodiment of a method for generating a context-specific word space.
Figure 3:
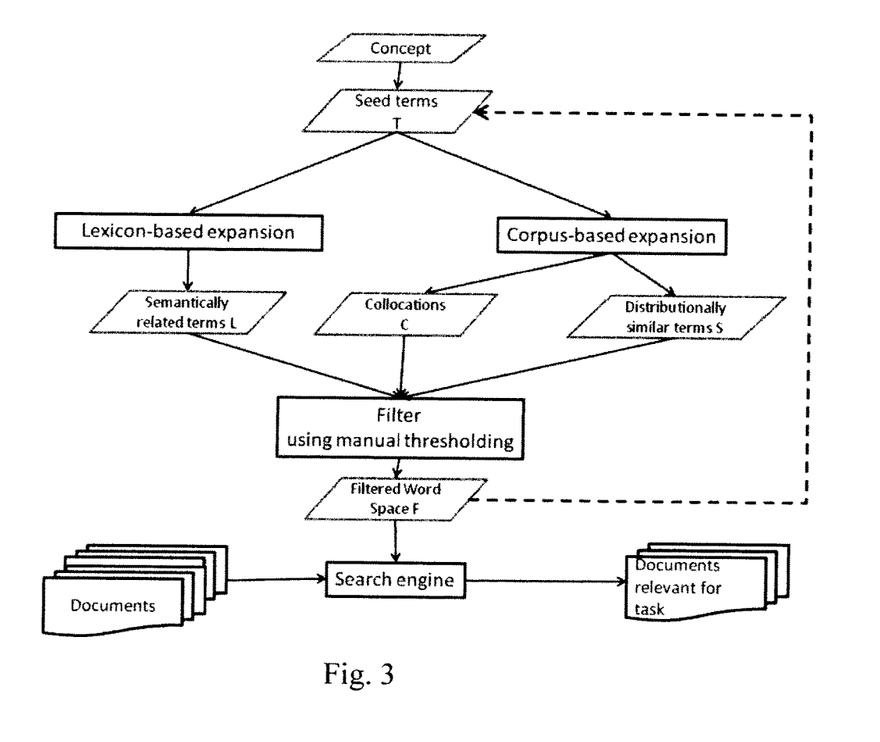
FIG. 3 is a flow chart diagram of an alternative embodiment of a method for generating a context-specific word space.

The same or different system 10 is used for one or both of list generation and relationship mining. FIGS. 2-3 relate to generating a context-specific word space. FIGS. 4-8 relate to relationship mining using latent Dirichlet allocation.

FIG. 2 shows a method for generating a context-specific word space. The sorting, outputting, receiving and categorizing are part of thresholding the list as a function of the scores and possibly without user review of the scores. The method is implemented using the system 10 of FIG. 1 or a different system. Additional, different or fewer acts than shown in FIG. 2 may be provided. For example, acts 22 and/or 24 may not be performed. As another example, only acts 28-36 are performed. In another example, an additional act of a user inputting one or more seed terms is provided. In yet another example, an additional act of a user inputting an indication of whether a term is relevant to a context is provided. The acts are performed in the order shown or a different order.

The acts may be performed automatically, manually, semi-automatically or combinations thereof. The acts shown in FIG. 2 are performed automatically, but may rely on manually entered information, such as seed term entry and/or entry of the indication received in act 32.

In act 20, a list is generated. The list is a list of terms. A term is a word, word combination, or part of a word.

The list is of terms associated with a concept. For example, words associated with a product are gathered. An example list for "engine" may include "motor," "machine," "motion," "car," "bike," "electric," and "nerves." Some of these words are more strongly related to an engine for robotics than other of these words. Any concept may be used, such as terrorism, a company, crime, money laundering, drugs, or products. The concept has any level of generality or specific focus, providing context-specific meaning. This context may limit the concept. The concept may correspond to symptoms or other possible predictors of a future event or diagnosis.

The list is generated from one or more seed terms. For example, the concept itself may be a seed term. As another example, one or more words related to the concept may be used as seed terms. The selection of the seed terms may skew or focus the concept to a specific context.

The seed terms are entered manually. A user thinks of, defines, or identifies one or more seed terms. Alternatively, the seed terms are determined based on a search term or other user entry. Some or all of the seed terms may be automatically determined, such as using one or more words with the highest frequency in a document as seed terms. Automated, semi-automated, or manual selection and entering of the seed terms may be provided.

In alternative embodiments, the list is generated without seed terms. The list is a list of terms from a document, a previously generated list, or other source of terms. By using seed terms, the manual process of entering a complete or final list may be avoided. The seed terms are used to automatically expand the list to include terms in addition to the seed terms. Terms related to the seeds are found using any now known or later developed technique. For example, lexicon-based expansion, corpus-based expansion or both are used.

In act 22, corpus-based expansion of the seed terms into a larger list of terms is provided. For corpus-based expansion, one or more databases that contain similarity scores and collocation scores for every word-pair in a given corpus are accessed or used. Each database is associated with a single corpus. Given a term (e.g., "engine"), the related terms as provided in the corpus are output with a score indicating the level of relatedness. Any corpus may be used, such as a collection of documents specific to a concept or a more general corpus.

The database or databases are precomputed word-relatedness databases, but may be computed as part of the corpus-based expansion. A word-relatedness database is constructed by finding collocation relatedness or distributional relatedness between all word pairs in a corpus. Collocation indicates words within a range of words of each other (e.g., "engine" within five words of "car"). Distribution indicates words with similar links to other words (e.g., "engine" and "motor" consistently used in the same manner). The user or program may query the database to get collocationally and/or distributionally related words for a given word.

Precomputed databases are available. These are constructed using large volumes of standard corpora (e.g., British National Corpus or Wikipedia). If needed, databases using task-specific corpora may be constructed. The database may be downloaded, stored, and/or queried.

The database also returns the relatedness score. Any measure of relation or closeness may be used. For example, a frequency of collocation or distributional similarity provides for more relation (e.g., provides a higher score). The score indicates how similar or close one term is to another term in meaning, usage, or other criteria. The score may be based on a specific context, such as a document or documents of a corpus, or may be based on general usage.

In one embodiment of corpus expansion, a list of seed terms T is received. All terms that are related to each term $t_i$ are found. The corpus expansion is represented as follows:

---

Corpus-based Expansion (T: seed terms, D: set of databases where each database $d^k$ contains relatedness computed between every word pair in corpus k)
for each seed term $t_i$ of the set T do:
    $C_i \leftarrow$ null
    $S_i \leftarrow$ null
    for each database $d^k$ of the set D do:
        for each collocation term $c_{ij}^k$ with weight $wtc_{ij}^k$ do:
            $C_i \leftarrow C_i \ U < c_{ij}^k, wtc_{ij}^k >$
        end for
        for each distributionally similar term $s_{ij}^k$ with weight $wts_{ij}^k$ do:
            $S_i \leftarrow S_i \ U < s_{ij}^k, wts_{ij}^k >$
        end for
        $F \leftarrow F \ U$ ThresholdFilter($t_i$; $C_i$)
        $F \leftarrow F \ U$ ThresholdFilter($t_i$; $S_i$)
    end for
end for
return F

---

The set $C_i$ stores all words that are collocated with $t_i$ and their closeness score. Here, $c_{ij}^k$ denotes the jth term that is collocated with $t_i$ in the database $d^k$ constructed using corpus k, and $wtc_{ij}^k$ denotes the collocational score between $c_{ij}^k$ and $t_i$. Similarly, set $S_i$ stores all words that are distributionally similar to $t_i$ and their similarity score. Here, $s_{ij}^k$ denotes the jth term that is found to be distributionally similar to $t_i$ in database $d^k$, and $wts_{ij}^k$ denotes the similarity score between $s_{ij}^k$ and $t_i$.

Both $C_i$ and $S_i$ are pruned using filtering (i.e., thresholding). The final list F contains the terms from $C_i$ and $S_i$ that have survived the filtering process. This is repeated for all seed terms to create the word space for the task. In alternative embodiments, only collocational terms or only distributional terms are used.

In act 24, lexicon-based expansion of the seed terms into a larger list of terms is provided. For lexicon-based expansion, the semantic neighbors of the seed term are found using a graphical lexicon. Lexicon expansion captures terms that are synonyms, attributes, more general, more specific, similar concepts, meronyms, holonyms, hypernyms, hyponyms, coordinate terms or others.

In one embodiment, Wordnet, a graphical lexicon, is used to find terms semantically related to each seed term. Wordnet provides a list of words that are related to a given term $t_i$ in the dictionary. Other lexicons may be used. All or fewer than all related terms may be identified. The depth may be user selected or preset. When depth=1, each seed term is expanded to only its direct neighbor in the lexicon. When depth=2, all neighbors of the direct neighbors are also put into the expanded list.

The expansion is to identify words related to the term $t_i$ in general usages in documents. The score is provided as an indication of the likelihood that a related term obtained from the lexicon may be used to retrieve a document relevant to term $t_i$. The lexicon may provide a score. If the lexicon does not provide a score, a corpus may be used to calculate a score for the words identified from the lexicon. For example, the Point-wise Mutual Information (PMI) between the related term obtained from Wordnet and $t_i$ is calculated. PMI can be computed using any large corpus, using an internet search engine, or by reference to pre-computed scores. Corpus-based relatedness of the semantic neighbors with the seed is used as the score.

In one embodiment of lexicon expansion, a list of seed terms T is received. All terms that are semantically related to each term $t_i$ are found. The lexicon expansion is represented as follows:

```
Lexicon-based Expansion (T: seed terms, L: Graphical Lexicon,
  d: depth of expansion)
  for each seed $t_i$ of the set T do:
    $L_i \leftarrow$ null
    for each neighbor $l_{ij}$ at depth d in L do:
      $wtl_{ij} \leftarrow PMI(t_i; l_{ij})$
      $L_i \leftarrow L_i \cup < l_{ij}, wtl_{ij} >$
    end for
    $F \leftarrow F \cup ThresholdFilter(t_i; L_i)$
  end for
  return F
```

Here, set $L_i$ stores words that are semantically similar to $t_i$ in the lexicon and their PMI score. $l_{ij}$ denotes the jth term that is related with $t_i$, and $wtl_{ij}$ denotes the PMI score between $l_{ij}$ and $t_i$. $L_i$ is pruned similarly to $C_i$ and $S_i$. The final list F contains the terms from $L_i$ that have survived the filtering process. This expansion and filtering are repeated for all seed terms to create the word space for the task.

The corpus or lexicon-based expansions may be used alone or without the other. In other embodiments, both corpus and lexicon-based expansion are performed. In alternative embodiments, a list is provided without performing expansion.

In act 26, the list of terms is sorted. The processor sorts the list based on the scores. The sort is in ascending or descending order. In one embodiment, the sort places the terms with the higher relatedness score at the beginning. The terms more likely related to the concept are at the beginning. In alternative embodiments, a lower score indicates greater relatedness.

Each list $L_i$, $C_i$, and $S_i$ is sorted and thresholded separately. The lists remain separated by seed term as well. Alternatively, the terms are combined into one list for the concept $L_i$, $C_i$, and $S_i$ and sorted. In other embodiments, terms from different expansion but the same seed term are combined and sorted.

For a given list, the scores may be for closeness to one of the respective seed terms. The seed-related scores are used as concept scores. Alternatively, one of the seed terms is selected as a concept. Scores are determined for each term relative to the concept even if the term was identified by expansion of a different seed.

In act 28, an iterative thresholding is performed. The thresholding includes acts 30, 32, 34, and 36, but fewer, additional, or different acts may be provided. For example, acts 34 and 36 are alternatives with one but not both being performed for each iteration. As another example, acts 30 and 32 are performed in the context of a processor outputting and receiving. In the context of the user, a selection is made in response to an output query.

Any number of iterations may be provided. The process is stopped at two or more iterations based on any criteria. For example, all of the terms in the list being labeled as relevant or not is one criterion. Another criterion may be a set or predetermined number of iterations, such as performing the process for 5 iterations. The number of iterations may be adaptive to the number of terms in the list being thresholded.

Each iteration acts on unlabeled terms. Some or all of the unlabeled terms are labeled in each iteration. The expanded lists are altered using human-generated thresholds in each iteration. The alteration is the labeling. The labeling may correspond to removing or not. For example, some iterations remove terms from the list and at least one other iteration sets terms to remain on the list.

The thresholding is based on manual input. Filtering of the list of terms is by manual thresholding. The automatically expanded list is altered by using human feedback.

In act 30, one of the terms from the list is output. The output is to a user, such as outputting a display or text for the term. The output is provided as part of a user interface or message. The output of the term is to find the index or threshold below which the terms from the sorted list should be discarded. This is achieved by iteratively asking for the user to judge relevance of terms. To obtain the judgment, a term is output.

Rather than outputting every term, only a sub-set of terms are output. One term is output in each iteration, but more than one term may be used in each iteration to reduce the number of iterations.

At least one of the terms output in a given iteration is selected from between two other terms in the sorted list. For example, the term at a midpoint or median of unlabeled terms in the list is selected. The term or one of the terms with a score that is closest to an average score, median, or midpoint of scores of unlabeled terms may be selected. For example, the start and end are set to the indices of the first and last term of the original sorted list in a first iteration. Then, the term from the mid point of this list (e.g., at index←(start+end)/2) is selected. For other iterations, the beginning and end terms are of the set of unlabeled terms. In an example outputting more than one term in an iteration, the multiple terms are selected to have any spacing in the list of unlabeled terms, such as at index←(start+end)/3) and at index←(2(start+end))/3).

To assist the user, the selected term or terms are displayed with text querying a user to judge the term. The text solicits the input regarding the term from the user. For example, the term "car" is output for the concept or seed term of "engine" with a question: "is "car" related to the engines for a robot?". Other questions may be used, such as including the concept term or soliciting a level of relatedness (e.g., scale of 1-5).

While the score may have directly or indirectly resulted in the term being selected, the term may be output without the score. The user is not asked to select or examine a score (i.e., the number). By providing the term without the score, the user is forced to focus on judging relevance of the word to the current context or concept. In alternative embodiments, the score is provided with the term, but the user is asked to judge the relevance of the term.

In act 32, an indication of whether the output term is related to the context is received. For example, the context is "engines for robots," so the term "car" is not related. The user indicates that car is not related to the context. As another example, the context is "automobile engines," so the user judges "car" to be related. The indication is binary, such as a response to a yes/no question (e.g., term is related or unrelated). Alternatively, the indication is a value from a range of values. In response to soliciting an indication from a user of whether a term belongs with the concept in the context-specific word space, the response is received.

The user input receives the response. The processor receives the response from the user input. Alternatively, the response is received via a network connection.

Based on the response, one or more unlabeled terms are labeled. In at least one iteration, a plurality of unlabeled terms is labeled based on one judgment. A plurality may be labeled for all iterations, all but the last iteration, or for fewer iterations. For example, about half of the unlabeled terms of the list are labeled in each iteration. "About" accounts for multiple terms with a same score or labeling of half plus one or minus one in a list with an odd number of terms. By labeling about half of the unlabeled terms in each iteration, all or most of the terms are more efficiently labeled than separately labeling each term of the list. A new term is selected and output, and the resulting judgment is used for labeling that term and others.

The labeling is based on the score. The term on which judgment was made is associated with a score. The other terms of the list have the same, higher, or lower scores. Acts 34 and 36 represent the labeling with a binary judgment. Labeling includes flagging, discarding, or otherwise indicating whether the term is to remain part of the list for the concept in the context-specific word space.

In act 34, the judgment is that the output term is related to the context. The terms with the same and higher relatedness scores are labeled as related as well. The terms with lower relatedness scores remain unlabeled. The scores are relied upon to categorize the terms based on a judgment for one term. The categorization or labeling is performed automatically with a processor in response to the user indication.

All of the terms with relatedness scores the same and higher than the relatedness score of the output term are categorized as related to the context. If the user judges the term to be related to $t_i$ in the context of the application, all elements from this index up to the end element are assumed to be valid as all terms occurring after this index have an even higher relatedness scores. In alternative embodiments, only terms with a score a preset level above or below the score of the judged term are labeled (e.g., judged term has a 0.5 score so all 0.6 and above scores indicate relevant).

In act 36, the judgment is that the output term is unrelated to the context. The terms with the same and lower relatedness scores are labeled as unrelated as well. The terms with higher relatedness scores remain unlabeled. The scores are relied upon to categorize the terms based on a judgment for one term. The categorization or labeling is performed automatically with a processor in response to the user indication.

All of the terms with relatedness scores the same and lower than the relatedness score of the output term are categorized as unrelated to the context. If the user judges the term to be not sufficiently related to $t_i$ in the context of the application, all elements from the start to this index are assumed to be invalid as all terms occurring before this index have an even lower relatedness score. In alternative embodiments, only terms with a score a preset level above or below the score of the judged term are labeled (e.g., judged term has a 0.5 score so all 0.4 and below scores indicate relevant).

As represented by the feedback loop of FIG. 2, the outputting, receiving, and labeling acts are repeated for other terms in the list. After one iteration, some of the terms are labeled and some are not. The unlabeled terms are in a contiguous group in the sorted list, but may be in discontinuous groupings. The repetition is performed for the remaining terms. A midpoint or other term of the remaining unlabeled terms is selected for output to the user. The user's judgment is received and one or more other terms are categorized based on the judgment of this new term.

For example, the repetition is for the terms with relatedness scores lower than the relatedness score of the term judged as related in the previous iteration. The region of inspection is reduced to span from start up till this point (end←index), and the method is called for the reduced search space.

As another example, the repetition if for the terms with relatedness scores higher than the relatedness score of the term judged as unrelated in the previous iteration. Using the midpoint term of the unlabeled terms in each iteration, about half the terms are categorized in each iteration. The region of inspection is reduced to span from this index plus one (start←index+1) to the end, and the method is called for the reduced search space.

The iterations may occur until all the terms are categorized. At any point of time, the term at the index end is valid, while it is undetermined if the term at start is valid. Finally, when start=end (or (start+1)=end), the threshold index (threshold) is found. The iterations cease as all the terms are labeled. The unrelated terms may be labeled by a flag or may be labeled by discarding from the list.

Rather than the user choosing a particular numerical score value to define the cutoff or threshold, the user inspects words. Word inspection is a much more intuitive task. The relatedness scores are used to sort the list of related words, so that a binary or sampled search can be performed. The user need not inspect the entire list. Reviewing each word in the list would require the user to perform $O(n)$ judgments. Using a selection of a single word at the midpoint in each iteration thresholds by eliciting only about $O(\log(n))$ judgments. This gain can be significant when the words paces are large and complex and there are a large number of starting terms. In such cases, the expanded lists may run to thousands of words. Smaller or larger lists may be used.

One example embodiment of the thresholdinq is represented as:

```
ThresholdFilter (t_i: seed term, L_i: list of term-weight tuples < term;wt >
    that are related to t_i)
sortedList ← terms (words) from L_i sorted in ascending order according to
    weights
start ← 0
end ← lengthOf (sortedList) – 1
threshold ← askUser(sortedList, start, end)
filteredWordSpace ← terms (words) from sortedlist from indices threshold
    to end
return filteredWordSpace
AskUser (start, end, t_i: seed term, sortedList list of words (terms) sorted
    according to their relatedness weights to the seed term)
if start = end then
    return end
end if
if (start + 1) = end, then
    queryTerm ← sorted List(start)
    get yes/no response from user on whether it is valid to consider
        queryTerm related to t_i
    if queryTerm is valid then
        return start
    else
        return end
    end if
end if
index ← (start+end)/2
queryTerm ← sortedList(index)
get yes/no response from user on whether it is valid to consider query-
Term
    related to t_i
if queryTerm is valid then
    end ← index
else
    start ← index + 1
end if
AskUser(start; end; sortedList)
```

The method is repeated for each list. The lists may be addressed sequentially. Alternatively, terms for different lists are output at the same time to the user. The user judgments for the terms are used for the corresponding lists (i.e., used independently).

In an alternative embodiment, the iteration is performed at one time. A plurality, but fewer than all, of the terms are output to the user on one display. For example, every third or fourth term from the list is output. The user is requested to indicate relatedness for each word of the output sub-list. Each judgment is used for higher or lower terms between the terms output to the user. Where a conflict occurs or terms are unlabeled after these selections, the process is repeated for the unlabeled terms, but with different terms being output. The output, receiving, and labeling are repeated for different terms, but based on simultaneous display of the terms.

FIG. 3 shows an alternative representation of the method of FIG. 2. The concept is used to find the seed terms. For each seed term, lexicon and corpus expansion are performed. Semantically, collocationally, and distributionally related terms are generated. These lists are thresholded, resulting in lists of relevant terms. These terms may be used for searching related to the concept. For example, a search engine searches documents related to the concept of engines for robots. Documents relevant to this concept are identified based on the occurrence, frequency of occurrence, or other criteria using the lists of terms related to the concept. In this example, alternative designs, faults, or other issues related to engines for robots may be identified by searching based on words related to the concept.

Figure 4:
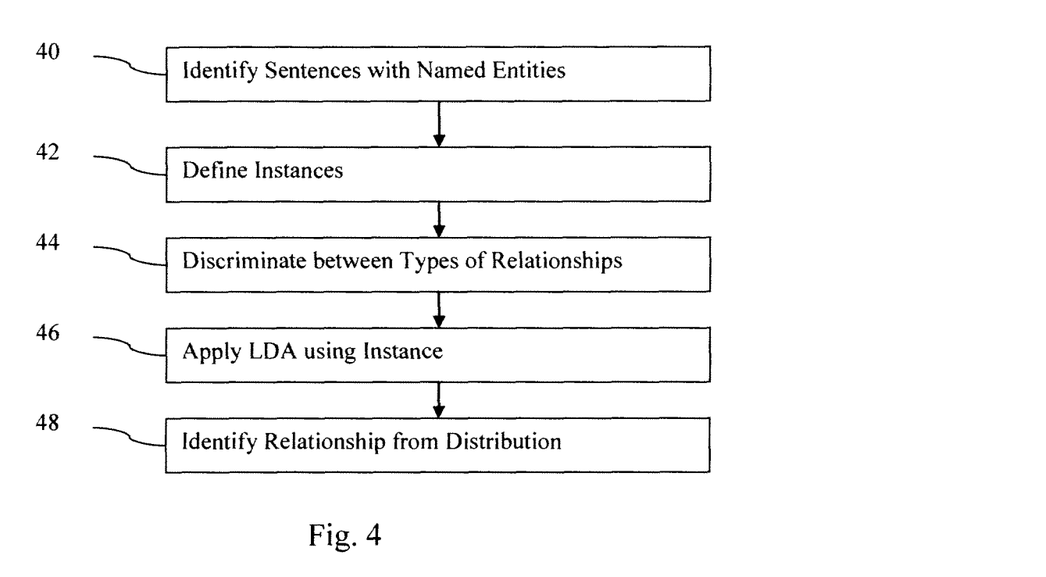
FIG. 4 is a flow chart diagram of one embodiment of a method for mining a relationship of two named entities.

FIG. 4 shows a method for mining a relationship of two named entities. The method is implemented using the system 10 of FIG. 1 or a different system. Additional, different or fewer acts than shown in FIG. 4 may be provided. For example, act 44 is not performed separately from act 46. The acts are performed in the order shown or a different order.

The acts may be performed automatically, manually, semi-automatically or combinations thereof. For example, all of the acts shown in FIG. 4 are performed automatically, but may rely on manually entered information, such as specific named entities of interest or selection of a corpus.

Relation mining attempts to detect and characterize relations between named entities (NEs). There are different types of named entities and different types of relationships between named entities. For example, two entities of type person (e.g., Joe Happy and Sue Somebody may be related, such as a spousal relation (i.e., they are married). Similarly, a person (e.g., Joe Happy) may be related to an organization (e.g., Happy Healthcare) by a founder or member of relation. Two organizations (e.g., Happy Healthcare and Imaging Diagnostics Co.) may be related via part of relation. Persons and organizations (e.g., Joe Happy and Happy Healthcare) may be related to locations (e.g., 123 Smiling Lane, Laughing, Kans.) via located at relations. Other types of named entities and/or types of relations may be provided. The types may be limited to types needed, such as just using persons.

There are a number of ways to characterize relations between entities. For example, chacterizations provided by the Automatic Content Extraction (ACE) dataset are used. The ACE program definitions and annotations for NEs and their relations are used.

Using defined types of entities and types of relationships, Latent Dirichlet Allocation (LDA) may be used for determining relationships of NEs from one or more documents. LDA is typically used for inferring a topic distribution, such as determining that a document deals with money laundering and finances. The LDA topic model infers the topic distribution in the document or documents.

LDA is defined primarily for detecting or clustering document topics. The relation mining task is translated into the LDA framework. The text between a given pair of NEs is considered analogous to a document, and the relation type between them is considered as the topic to be found or is considered as a response variable which is closely related to hidden topics detected. Namely, hidden topics, playing as hidden semantic features, contribute to the construction of training models and the prediction of relation types. Thus, each relation is a unique "topic." Having no relation is also a category. Relation detection and categorization may be encoded into a single problem. Similar to topics, different relations may have different distribution of features, which may be captured by the LDA model.

For LDA in determining the relationship of NEs, mini-documents are created. The mini-documents may include both NEs, words between, or words surrounding the two NEs. LDA itself is unsupervised. The relation types between two NEs are annotated in ACE corpus. Therefore, supervised labels may be used for training. Thus, supervised machine learning models are used to identify the types of relationships between two NEs. Another change to the LDA is use of supervised machine learning to identify the types of relationships between two NEs. LDA is used to determine the distribution of those types of relationships. A supervised topic model discovers a latent relationship representation of the mini-documents and a response parameter distribution. The topic representation is discovered with observed response variables during training. During testing, the topic distribution of each mini-document forms a prediction of the relation types.

In act 40, a sentence with at least the two named entities is identified. One or more documents are loaded or otherwise designated for processing. For example, a set of documents related a suspect (Sneaky Sam) are obtained and stored in a database for analysis. A more generalized collection of documents may be used, such as all documents at a website, a book, a collection of newspapers, or other collection. The documents are obtained manually by a user or may be identified by searching for the person's name in the documents.

The documents are searched to identify all named entities in the documents or in the documents and mentioned in a same sentence, paragraph, or within a word count of the person. Similar to topic models, word information is used. The text is first preprocessed to find all the named entities. A standard Named Entity Recognizer or manual annotations is used. In one embodiment, the ACE-05 corpus provides NE annotations. The searching may be automatic, such as searching for any named entities listed in a reference source (e.g., ACE). In alternative embodiments, the named entities are identified without reference to a specific named entity.

The relationship of all the named entities may be determined or specific named entities from the list may be selected. For each sentence, all NEs contained in the sentence are paired to create instances. Alternatively, other named entities of interest may be known or are manually entered without searching the documents.

Once a pair of named entities is identified, the relationship between the named entities may be determined from the documents. Sentences with both named entities in the same sentence are found. Punctuation is used to distinguish sentences. Alternatively, a word count is used. Any text, whether or not in a same sentence, where fewer than X words separate the named entities is identified as the sentence or sentences. Sentences may be identified for more than one pair of named entities, such as finding sentences with Sneaky Sam and Clepto Cleo and sentences with Sneaky Sam and Mel Moneyman.

In act 42, instances of the pairings are defined. For LDA to determine distribution in the context of named entities, instances other than documents are created. The processor defines each instance as the pair of named entities, a type of entity for each of the named entities, and text between the pair of named entities. Stop words or other words not likely to convey useful information may be removed. Since the named entities of each instance are within a same sentence and/or a limited number of words of each other, the text may be short relative to the document, such as being between zero to fifty words. In other embodiments, the instance includes text before and/or after each named entity as well as text between the named entities of the instance.

Other information may be included in the instance. For example, the part of speech of each of the words in the instance and their semantic roles are identified. The part of speech and semantic roles are looked up from a table or database.

For each pairing of named entities, more than one instance may be provided. All of the possible instances for each pair are found in the document or documents. A plurality of instances is defined for each pair of named entities. Alternatively, only a particular number of instances for a given pair are defined, such as only one hundred instances. Instances associated with less information (e.g., fewer words or repetitive of other instances) may be discarded.

In act 44, a model or classifier is applied to discriminate between types of relationships. For example, a support vector machine is trained to differentiate types of relationships. For each instance, the type of relationship indicated is identified. The support vector machine separates the instances by type. Any probabilistic or other machine-learning classifier may be used. Based on training data with known types of relationships and specific instances, the machine learnt classifier determines which words, type of entities, semantics, and/or other instance information distinguish between type of relationships and determines how these input features are related.

In act 46 (e.g., run parallel with act 44), latent Dirichlet allocation (LDA) is applied to the document or documents. The processor identifies the distribution of relationships. The relationship is selected based on the average over all the possible models and the latent topics. Latent topics are not relation types, but are hidden semantic features discovered by topic models. Together with response parameters, the one with highest average or expectation is identified as the relationship for the instance of document. The instance information with or without the type of relationship information from the discrimination act 44 is used to determine the distribution.

LDA is a generative model that views each document as a mixture of various topics. In the case of relationship mining, LDA views each instance as a mixture of various relationships. LDA defines three basic concepts as word, document and corpus. A word is the basic unit of discrete data, from vocabulary indexed by 1, . . . , V. The v-th word is represented by a V-vector w such that $w_v=1$ and $w_u=0$ for $u \neq v$ (i.e., binary indication of whether the word is in the document). A document (instance) is a sequence of N words denoted by $d=w_1, w_2, \ldots, w_N$. A corpus is a collection of M documents denoted by $D=d_1, d_2, \ldots, d_M$.

Figure 5:
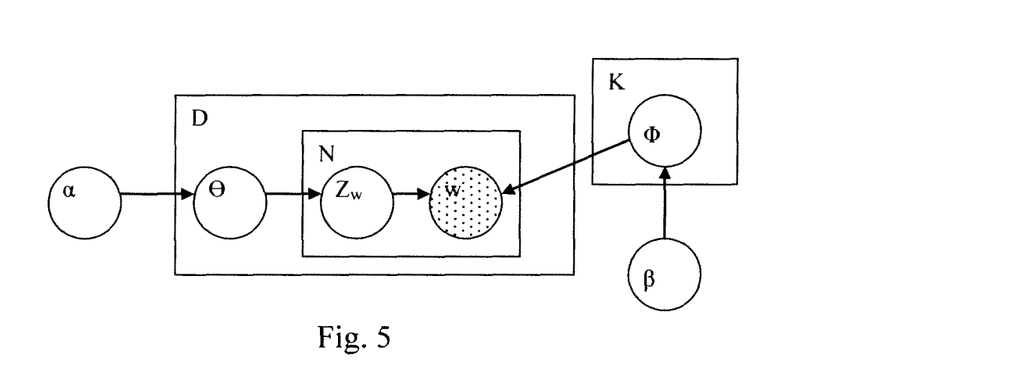
FIG. 5 is an example graphical representation of LDA.

The LDA graphical model is illustrated in FIG. 5. Here the circle w in the inner plate is an individual word. The plate is an individual document and N is the number of words. The outer plate is the corpus, which is composed of D documents. Five other circles represent different parameters. α and β are two hyper-parameters to launch the sampling. θ and φ depend on α and β, respectively. The conditional distribution θ given α is chosen as the Dirichlet, the multinomial distribution or probabilistic distribution over outcomes. As shown in FIG. 5, θ generates z; z and φ jointly generate w. θ and φ are both multinomial distributions. θ represents the topic distribution of each document, and φ and z represent the topic distribution of each word. Given the parameters α and β, the joint distribution of a topic mixture θ, a set of N topics z, and a set of N words, w is given by: $p(\theta, z, w|\alpha, \beta) = p(\theta|\alpha) \prod p(z_n|\theta) p(w_n|z_n, \beta)$ from n=1 to N. In FIGS. 5-8, the dot pattern indicates an observed variable. Integrating over θ and summing over z, the marginal distribution of a document is given by: $p(w|\alpha, \beta)$=the integral of $p(\theta|\alpha)(\prod$ from n=1 to N$)\Sigma p(w_n|z_n, \beta) d\theta$.

Figure 6:
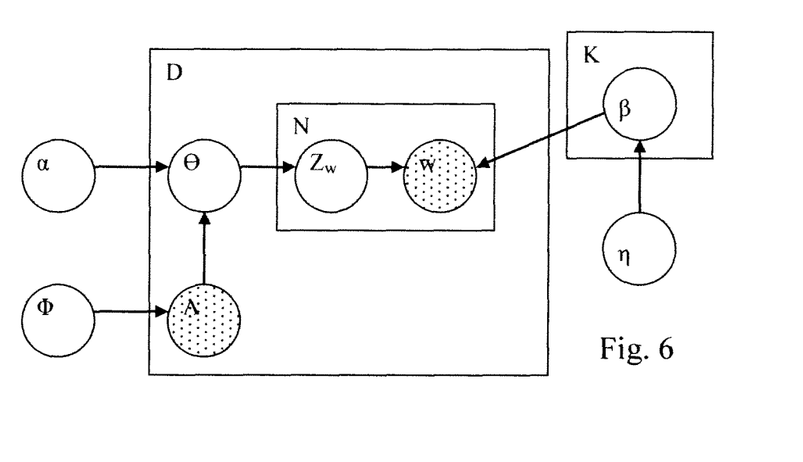
FIG. 6 is an example graphical representation of labeled LDA (LLDA)
Figure 7:
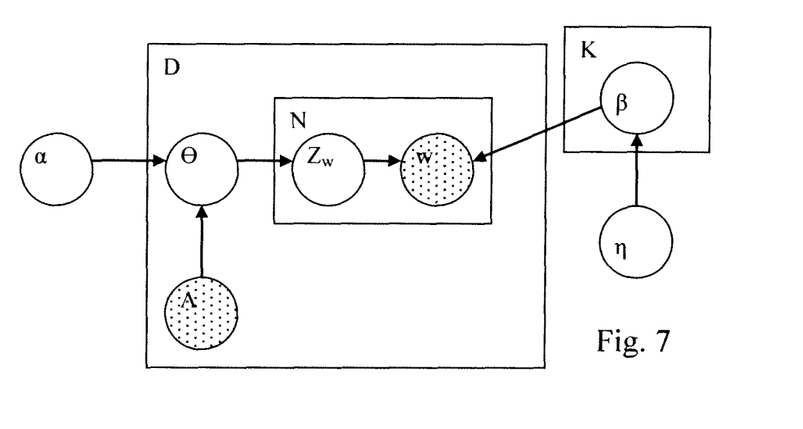
FIG. 7 is an example graphical representation of LLDA for relationship mining.

Labeled LDA (LLDA) may be used. FIG. 6 is a graphical model of LLDA. For relationship mining, the LLDA may be applied without a labeling prior probability. Like LDA, LLDA (LLDA) models considers each document as a mixture of underlying topics and generates each word from one topic. However, unlike LDA, LLDA incorporates supervision by constraining the topic model to use only those topics that correspond to a document's (observed) label set.

For LLDA, each document d is represented by a tuple of a list of word indices $w^d=(w_1, w_2, \ldots, w_{Nd})$ and a list of binary relation type presence/absence indicators $\wedge^{(d)} = (l_1, \ldots, l_K)$ where each $w_i$ is a member of $\{1, \ldots, V\}$ and each $l_k$ is a member of $\{0, 1\}$. $N_d$ is the document length, V is the vocabulary size, and K is the total number of unique labels (the number of topics as well) in the corpus.

The multinomial topic distributions over vocabulary $\beta_k$ are drawn for each topic k, from a Dirichlet prior η. The traditional LDA model then draws a multinomial mixture distribution $\theta^{(d)}$ over all K topics, for each document d, from a Dirichlet prior α. LLDA would restrict $\theta^d$ to be defined only over the topics that correspond to its label $\wedge^{(d)}$. Since the word-topic assignments $z_i$ are drawn from this distribution, this restriction ensures that all the topic assignments are limited to the document's label.

This objective is achieved with the following steps. A Bernoulli coin toss is used for each topic k, with a labeling prior probability $\phi_k$. Next, the vector of document's labels are defined to be $\lambda^d = \{k | \wedge_k^{(d)} = 1\}$. A document-specific label projection matrix $L^{(d)}$ of size $M_d \times K$ may be defined for each document d, where $M_d = |\wedge_k^{(d)}|$. M is the number of documents, but $M_d$ is the number when the document is assigned 1 for a topic. For each row i as a member of $\{1, \ldots, M_d\}$ and column j as a member of $\{1, \ldots, K\}$: $L_{ij}^{(d)} = \{1$ if $\lambda^{(d)} = j$; 0 if otherwise$\}$. Namely, the $i^{th}$ row of $L^d$ has an entry of 1 in column j if and only if the $i^{th}$ document label $\lambda^{(d)}$ is equal to the topic j and zero otherwise. The $L^d$ matrix is used to project the parameter vector of the Dirichlet topic prior $\alpha = (\alpha_1, \ldots, \alpha_K)^t$ to a lower dimensional vector $\alpha^{(d)}$ as follows: $\alpha^{(d)} = L^{(d)} \times \alpha = (\alpha_{\lambda 1}(d), \ldots, \alpha_{\lambda Md}(d))^T$. $\theta^{(d)}$ is drawn from a Dirichlet distribution with parameters $\alpha^{(d)} = L^{(d)} \times \alpha = (\alpha_2, \alpha_3)^T$. For example, suppose K=4 and that a document d has labels given by $\wedge^{(d)} = \{0, 1, 1, 0\}$, which implies $\lambda^{(d)} = \{2, 3\}$, then $L^{(d)}$ would be: $L^{(d)} = (0\ 1\ 0\ 0/0\ 0\ 1\ 0)$. Then, $\theta^{(d)}$ is drawn from a Dirichlet distribution with parameters $\alpha^{(d)} = L^{(d)} \times \alpha = (\alpha_2, \alpha_3)^T$.

By using the formulation described above, the instances are input into the LDA system to detect relations. However, as LDA is an unsupervised model, LDA may often predict relations that are hard to interpret. Also, due to lack of supervision, LDA may group different relations from the ACE-05 corpus together. In order to guide the LDA model to predict relations from a pre-determined set (e.g., social relations between Person NEs, Located-at relation between Person and Location NEs), supervision is incorporated into the LDA model.

For incorporating supervision, LLDA is altered. The difference between LLDA and LDA lies in the labels—labels in LLDA are observed while in LDA are unknown. For relationship mining, the labels are relationship types from the ACE-05 corpus. But unlike LLDA for topic mining, only one relation type is involved in most instances. The Bernoulli is not needed to sample the labels. $\wedge$ may be treated as fully observed. Due to this difference, $\phi$ may be dropped out. Only a definite $\wedge$ is left as displayed in FIG. 7. The LDA and LLDA algorithm uses Gibbs sampling to arrive at the posteriors, but other sampling may be used.

Maximum entropy discrimination LDA (MEDLDA) may be used. MEDLDA may incorporate supervised modeling, providing a supervised MEDLDA with an observed response variable. With the addition of supervised information, such as response variables, the resulting topic models may have better predictive power for classification and regression.

Any supervised learning may be used. In one example, a support vector machine (SVM) is used. SVMs perform classification by constructing an N-dimensional hyper plane that optimally separates the data into two categories. Given a training set of instance-label pairs $(x_i; y_i)$; $i=1 \ldots I$ where $x_i$ is a member of $R^n$ and $y_i$ is a member of $\{1, -1\}^I$, SVMs use the solution of the following optimization problem: $\min_{w,b,\xi} \frac{1}{2} w^T w = C \Sigma \xi_i$. This problem is subject to $y_i(w^T \phi(x_i)+b) \geq 1-\xi_i$, $\xi_i \geq 0$. $x_i$ is the training vector, and the function $\phi$ maps the training vector to a higher dimensional space. The SVM finds a linear separating hyper plane with the maximal margin in this higher dimensional space. In addition, for the mapping, the SVM uses a kernel function defined as: $K(x_i,x_j) \equiv \phi(x_i)^T \phi(x_j)$.

Max-margin topic models may be provided for both continuous and categorical response variables. MedLDA utilizes the max-margin principle to train topic models and estimate predictive topic representations. Joint max-margin learning and maximum likelihood estimation are performed for arbitrary topic models.

The model may be described as below. A linear discriminant function F is assumed. Namely, $F(y, z_{1,N,\eta}) = \eta_y^T \bar{z}$, where $\bar{z}=(1/N)\Sigma_n z_n$. $\eta_y$ is a class-specific K-dimensional parameter vector associated with the class y, and $\eta$ is a K-dimensional vector by stacking the elements of $\eta_y$. Equivalently, F can be written as $F(y, z_{1 \ldots N}, \eta) = \eta^T f(y, \bar{z})$ where $f(y, \bar{z})$ is a feature vector whose components from $(y-1)K+1$ to $yK$ are those of the vector $\bar{z}$ and all the others are 0. From each single F, a prediction rule is derived as in SVM. A distribution of $q(\eta)$ is learned, and the average over all the possible models and the latent topics is performed as: $y^* = \arg \max_y E[\eta_y^T f(y,\ )|\alpha, \beta]$. The problem is to learn an optimal set of parameters $\alpha$, $\beta$ and distribution $q(\eta)$. The unsupervised LDA is used as the underlying topic model to discover the latent topic representation Z and thus solve the problem of learning parameters $\alpha$ and $\beta$.

The integrated latent topic discovery and multi-class classification model may be formulated as follows: $\min_{q,q(\eta),\alpha,\beta,\xi} L^u(q) + KL(q(\eta)||p_0(\eta)) + C\Sigma \xi_d$ s.t. "for all" d, $y \neq y_d$: $E[\eta^T \Delta f_d(y)] \geq \Delta l_d(y) - \xi_d$; $\xi_d \geq 0$, where $\Delta L^u(q)$ is a cost function (e.g., 0/1 loss as used in SVMs) that measures how different the prediction y is from the true class label $y_d$; $q(\theta, z|\gamma, \phi)$ is a variational distribution; $L^u(q)$ is a variational upper bound of $-\log p(W|\alpha, \beta)$; $\Delta f_d(y) = f(y_d, \bar{z}_d) - f(y, \bar{z}_d)$; and $\xi$ is the slack variable. $E[\eta^T \Delta f_d(y)]$ is the "expected margin" by which the true label $y_d$ is favored over a prediction y. In general, the aim is to find a latent topic representation $q(\theta, z|\gamma, \phi)$ and a parameter estimation $q(\eta)$.

MEDLDA is an extension of LDA that combines the capability of capturing latent semantics with the discriminative capabilities of SVM. For relationship mining as compared to topic mining, the named entity pairs within a sentence and the text between them are considered as a mini-document. Each mini-document is assumed to be composed of a set of topics. The topic model trained with these mini-documents given their relation type label generates topics biased toward relation types. The trained topic model may have good predictive power on relation types.

The MEDLDA framework integrates maximum likelihood estimation (MLE) and maximum margin estimation (MME). Specifically, MEDLDA is a combination of sLDA and support vector machines (SVMs). In order to employ rich and heterogeneous features, a separate exponential family distribution is introduced for each feature the MEDLDA model. A SVM system may be implemented using the same data. In relation mining, labels are relation types. The training vector includes the text between two NEs (the two NEs included). The training vector is based on the unigram word features. Relation mining using LLDA and SVM may have different advantages. The SVM system performs better than LLDA-based systems when the task is to detect the presence of a relation between entities. On the other hand, the LLDA systems perform better than the SVM system when the task is to categorize the relation type (once it has been determined that a relation exists between an entity pair). By combining the two models, improved relation mining may be provided. One way to combine the two models is to construct a multi-stage classifier. The first stage is the SVM classifier that performs binary classification and determines if a relation exists between two named entities in act 44. The second stage is the LLDA classifier in act 46 use to find the type of relation between the related entities.

Another alternative is to construct a single classifier combining the strengths of LLDA and SVM, performing acts 44 and 46 together rather than sequentially. The classifier determines whether a relation exists and also predicts the relation type in a single step. For example, the MedLDA algorithm is used. In order to make use of MedLDA, two changes are made as compared to MEDLDA for topic mining. First, the dependencies of variables are changed. In LLDA, relation types together with a hyper parameter $\alpha$ generate topic distribution $\theta$. Relation types and the topics are regarded to be the same thing. The numbers of relation types and topics are identical. But in a MedLDA-like model, relation types r are response variables generated by both parameters $\eta$ and z displayed as in FIG. 8. This change separates z and r with more flexibility and more true to the nature of relation types. Relation types represent relations between two mentions which are not necessarily equal to the topic of texts between mentions though they are related. One topic may correspond to more than one relation while two or more topics may correspond to one relation type. Topics detected play the role of hidden semantic features aimed at more accurately predicting the relation types.

Another change is the use of context features. A relationship distribution of the two named entities is determined with LDA and context features. The machine learned classifier uses syntax, semantics, syntax and semantics, or other context features in the input vector, such as part of the instance.

Figure 8:
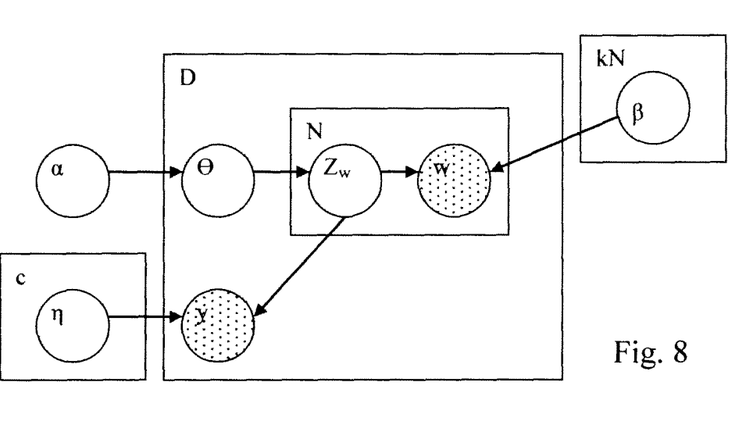
FIG. 8 is an example graphical representation of LLDA with max margin for relationship mining.

In FIG. 8, this change to use context is represented by the change of k to kN for the hyper-parameter $\beta$. This change aims at incorporating heterogeneous features such as syntax, semantics or other context features. This change also relates to the change in variable dependency. Since relations are separated from topics, relations may be related to other features. Instances of data are not bags of words any more, but a mixture of different feature sets. In FIG. 8, this change in feature set is shown by the use of x instead of w. With these changes, the new model is not a general MedLDA, but a supervised MedLDA with a response variable observed. A max-margin approach, such as SVM, has complementary behavior as that of the LLDA for relation mining. Med-LLDA in relationship mining is expected to incorporate the advantages of both SVM and LLDA and produce further improvements in relation recognition.

For relation detection, like many other NLP tasks, flexibility of incorporating part-of-speech tags, named entities, grammatical dependencies and other linguistic features may be useful. This limitation is overcome by introducing a separate exponential family distribution for each feature. MEDLDA-based relation detection model is a mixed-member Bayesian network.

Different features may be used, such as bag of words. In one embodiment, SYN features are constructed to capture syntactic, semantic and structural information of the mini-document. They include features such as HM1 (the head word of the first mention), HM2 (the head word of the second mention), ET1, ET2, M1 and M2 (entity types and mention types of the two mentions involved), #MB (number of other mentions in between the two mentions), and #WB (number of words in between the two mentions). Other features may be used.

COMP features are composite features that are similar to SYN, but they additionally capture language order and dependencies between the features mentioned above. These include features such as HM1HM2 (combining head word of mention 1 and head word of mention 2), ET12 (combinations of mention entity type), ML12 (combination of mention levels), M1 ln M2 or M2 ln M1 (flag indicating whether M2/M1 is included in M1/M2). Composite features may capture ordering information. The ordering of words is not captured by a bag of words feature. Bag of words features assume exchangeability. This works for models based on random or seeded sampling (e.g. LDA)—as long as words sampled are associated with a topic, the hidden topics of the documents may be discovered. In the case of relationship mining, this assumption may work with symmetric relations. However, when the relations are asymmetric, ordering information may be important. Composite features such as HM1HM2 encode what mention head word precedes the other. Features such as M1 ln M2 or M2 ln M1 capture token dependencies. Besides exchangeability, LDA-based models also assume that words are conditionally independent. Consequently, the system cannot capture the knowledge that some mentions may be included in other mentions. By constructing features such as M1 ln M2 or M2 ln M1, the dependency information is encoded.

Referring to FIG. 4, the relationship of the two named entities is identified in act 48. After application of the LDA type (e.g., LLDA or MEDLDA) model, the processor outputs the relationship. Given a distribution of instances in a corpus, one type of relationship may be more likely or common. This relationship is identified as existing between the pair of named entities. The relationship distribution indicates the relationship.

Other relations may be output, such as outputting distribution information. The relationships between other named entities in the corpus may be output.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for mining a relationship of at least a first and a second named entity comprising:
identifying a sentence with at least the first and the second named entity in a document;
defining, by a processor, a first instance comprising the first and the second named entity, a type of named entity for each of the first and the second named entity, and text in the sentence between the first and the second named entity;
applying, by a processor, latent Dirichlet allocation (LDA) to the document, the LDA including an input of the first instance, and then determining a distribution of types of relationship as an output, the types of relationship comprising labels of how the first named entity relates to the second named entity; and
selecting one of the types of the relationship as the relationship for the first and the second named entity,
wherein applying the LDA comprises applying a supervised maximum entropy discrimination LDA with the characteristic types of relationships as observed response variables of an output for supervision of the supervised maximum entropy discrimination LDA.

2. The method of claim 1, wherein identifying the sentence comprises pairing named entities in sentences of the document, and wherein defining comprises defining a plurality of instances including the first instance.

3. The method of claim 2 wherein applying the LDA comprises identifying the relationship for each instance of the plurality of instances.

4. The method of claim 1, wherein determining the distribution of types of relationship comprises discriminating between types of relationship by using a machine learning classifier.

5. The method of claim 4, wherein for discriminating, the machine learnt classifier uses training data with known types of relationship and specific instances.

6. The method of claim 4, wherein for the first instance, the type of relationship indicated is identified by a support vector machine.

7. The method of claim 1, wherein the selection of one of the types of the relationship as the relationship for the first and the second named entities is based on an average over all possible models and latent topics, wherein latent topics are hidden semantic features discovered by topic models.

8. A method for mining a relationship of at least a first and a second named entity comprising:
identifying a sentence with at least the first and the second named entity in a document;
defining, by a processor, a first instance comprising the first and the second named entity, a type of named entity for each of the first and the second named entity, and text in the sentence between the first and the second named entity;
applying, by a processor, latent Dirichlet allocation (LDA) to the document, the LDA including an input of the first instance, and then determining a distribution of types of relationship as an output, the types of relationship comprising labels of how the first named entity relates to the second named entity; and
selecting one of the types of the relationship as the relationship for the first and the second named entity,
wherein applying the LDA comprises applying a labeled LDA without a labeling prior probability.

9. A method for mining a relationship of at least a first named entity and a second named entity on a non-transitory computer readable storage media having stored therein data representing instructions executable by a programmed processor, the method comprising:

applying latent Dirichlet allocation (LDA) to a document, which is stored on the non-transitory computer readable storage media, with identified sentences with the first and the second named entity, the LDA including an input of the first instance, the first instance comprising the first and the second named entity, a type of named entity for the first and the second named entity and text in a sentence between the first and the second named entity, and then determining a distribution of types of relationship as an output of the LDA, the types of relationships comprising labels of how the first named entity relates to the second named entity; and selecting one of the types of relationship as the relationship for the first and the second named entity, wherein applying the LDA comprises applying a supervised maximum entropy discrimination LDA with the characteristic types of relationships as observed response variables of an output for supervision of the supervised maximum entropy discrimination LDA.

* * * * *